(12) United States Patent
Revsin et al.

(10) Patent No.: US 7,013,418 B1
(45) Date of Patent: Mar. 14, 2006

(54) METHOD AND APPARATUS FOR RELIABLE DELIVERY OF STATUS INFORMATION FOR MULTIPLE SETS OF DATA UNITS IN A SINGLE PACKET

(75) Inventors: Vitaly S. Revsin, Andover, MA (US); Alexander M. Pass, North Andover, MA (US); Irina P. Slutsky, Andover, MA (US)

(73) Assignee: Network Appliance, Inc., Sunnyvale, CA (US)

( * ) Notice: Subject to any disclaimer, the term of this patent is extended or adjusted under 35 U.S.C. 154(b) by 674 days.

(21) Appl. No.: 10/237,840

(22) Filed: Sep. 9, 2002

Related U.S. Application Data (60) Provisional application No. 60/336,107, filed on Nov. 15, 2001.

(51) Int. Cl.
*H04L 1/16* (2006.01)
(52) U.S. Cl. .................................. 714/748
(58) Field of Classification Search ............. 714/748, 714/749
See application file for complete search history.

(56) References Cited

U.S. PATENT DOCUMENTS

| | | | | |
|---|---|---|---|---|
| 4,905,234 A | * | 2/1990 | Childress et al. | 370/349 |
| 5,487,068 A | * | 1/1996 | Smolinske et al. | 370/450 |
| 5,638,371 A | * | 6/1997 | Raychaudhuri et al. | 370/310.2 |
| 5,684,791 A | * | 11/1997 | Raychaudhuri et al. | 370/310.2 |
| 5,727,002 A | * | 3/1998 | Miller et al. | 714/748 |
| 5,784,362 A | * | 7/1998 | Turina | 370/321 |
| 6,112,323 A | * | 8/2000 | Meizlik et al. | 714/748 |
| 6,115,390 A | * | 9/2000 | Chuah | 370/443 |
| 6,269,080 B1 | * | 7/2001 | Kumar | 370/236 |
| 6,317,430 B1 | * | 11/2001 | Knisely et al. | 370/394 |
| 6,367,045 B1 | * | 4/2002 | Khan et al. | 714/748 |
| 6,441,782 B1 | * | 8/2002 | Kelly et al. | 342/359 |
| 6,469,481 B1 | * | 10/2002 | Tateishi | 323/282 |
| 6,496,481 B1 | * | 12/2002 | Wu et al. | 370/242 |
| 6,505,034 B1 | * | 1/2003 | Wellig | 455/69 |
| 6,505,253 B1 | * | 1/2003 | Chiu et al. | 709/235 |
| 6,557,135 B1 | * | 4/2003 | Balachandran et al. | 714/750 |
| 6,574,668 B1 | * | 6/2003 | Gubbi et al. | 709/237 |
| 6,601,207 B1 | * | 7/2003 | Vanttinen | 714/748 |
| 6,650,869 B1 | * | 11/2003 | Kelly et al. | 455/13.2 |
| 6,658,619 B1 | * | 12/2003 | Chen | 714/748 |
| 6,697,331 B1 | * | 2/2004 | Riihinen et al. | 370/236 |
| 6,704,898 B1 | * | 3/2004 | Furuskar et al. | 714/751 |
| 6,763,491 B1 | * | 7/2004 | McDonnell | 714/750 |
| 6,778,501 B1 | * | 8/2004 | Malmgren et al. | 370/236 |

* cited by examiner

*Primary Examiner*—Stephen M. Baker
(74) *Attorney, Agent, or Firm*—Weingarten, Schurgin, Gagnebin & Lebovici LLP (57) ABSTRACT

A system and method for providing data delivery and processing status from at least one receiving device to a transmitting device. Data is sent to one or more receiving devices in bursts consisting of multiple data transfer units (DTUs). The receiving device or devices provide one or more status reports to the transmitting device, describing the delivery and processing status of bursts transmitted from the transmitting device. Each status report may represent the receive and/or processing status packet with regard to multiple bursts sent from the transmitting device to a receiving device. Status reports may be generated by a receiving device in response to detection of a predetermined condition such as the end of a received burst. Each status report may describe the receipt and/or processing status of all DTUs in all bursts that have previously been received by the receiving device from the transmitting device.

26 Claims, 7 Drawing Sheets

METHOD AND APPARATUS FOR RELIABLE DELIVERY OF STATUS INFORMATION FOR MULTIPLE SETS OF DATA UNITS IN A SINGLE PACKET

CROSS REFERENCE TO RELATED APPLICATIONS

This application claims priority under 35 U.S.C. §119(e) to provisional patent application Ser. No. 60/336,107 filed Nov. 15, 2001.

STATEMENT REGARDING FEDERALLY SPONSORED RESEARCH OR DEVELOPMENT

N/A

BACKGROUND OF THE INVENTION

The present invention relates generally to communication protocols, and more specifically to a system for providing reliable delivery of status information for multiple sets of data units in a single status report packet.

In many existing applications, the reliable transmission of data from a transmitting device to one or more receiving devices requires that feedback information be provided from the receiver(s) to the transmitter, in order to acknowledge receipt or request re-transmission of the data. It is often desirable to minimize the costs associated with delivering such feedback information. For example, in many types of networks, including communication satellite based networks, large amounts of data may be transmitted through high-speed channels to potentially large numbers of receiving devices. However, the feedback information indicating the delivery status of the transmitted data at the receiving devices is sometimes not sent to the transmitting device using the high speed channels. Instead, a lower bandwidth "back-channel" is sometimes employed to convey acknowledgements to the transmitter. A back-channel used to deliver feedback information from receiving devices to a transmitting device is also often less reliable than the channels used for carrying data from the transmitting device to the receiving devices.

Under such circumstances, it would be desirable to ensure that feedback information regarding the delivery of data to receiving devices is provided to the transmitting device in a way that reduces the need for retransmission of such feedback data, and without using excessive amounts of bandwidth. Otherwise, the performance of transmitting devices may be adversely impacted while they await the delivery of feedback information regarding data they have previously transmitted.

In some existing systems, a separate status packet has been required to communicate the delivery status of each transmitted data block. In other systems, such as the Transport Control Protocol (TCP), where multiple data blocks were received successfully, a single acknowledgement packet may be used to indicate the correct receipt of those data blocks.

For the above reasons, it would be desirable to have a new system for reliably and efficiently providing a rich set of delivery status information from potentially large numbers of receiving devices to a transmitting device.

SUMMARY OF THE INVENTION

A system and method are disclosed for providing status information regarding data transmitted from a transmitting device to at least one receiving device. In the disclosed system, a transmitting system sends data to one or more receiving devices in sets of multiple data transfer units (DTUs). The DTUs may, for example, be packets, cells, or other specific types of data units. The sets of DTUs are referred to herein as "bursts". The disclosed system reliably transmits bursts from a transmitting device to potentially many receiving devices. Multiple bursts may be processed simultaneously in both the transmitting device and the receiving devices.

The receiving device or devices provide one or more status reports to the transmitting device, describing the delivery and processing status of bursts transmitted from the transmitting device. Advantageously, each status report may represent receive and/or processing status with regard to multiple bursts sent from the transmitting device. Status reports may be generated by a receiving device in response to detection of the end of a received burst, in response to a request from the transmitting device, or in response to some other event. In an illustrative embodiment, each status report describes the receipt and/or processing status of all DTUs in all bursts that have been transmitted to the receiving device from the transmitting device, for example, over the course of a communication session between the transmitting device and the receiving device.

BRIEF DESCRIPTION OF THE SEVERAL VIEWS OF THE DRAWINGS

The invention will be more fully understood by reference to the following detailed description of the invention in conjunction with the drawings, of which.

DETAILED DESCRIPTION OF THE INVENTION

All disclosures of U.S. provisional patent application No. 60/336,107, filed Nov. 15, 2001, and entitled "A Method and Apparatus for Reliable Delivery of Status Information for Multiple Sets of Data Units in a Single Packet," are hereby incorporated herein by reference.

Figure 1:
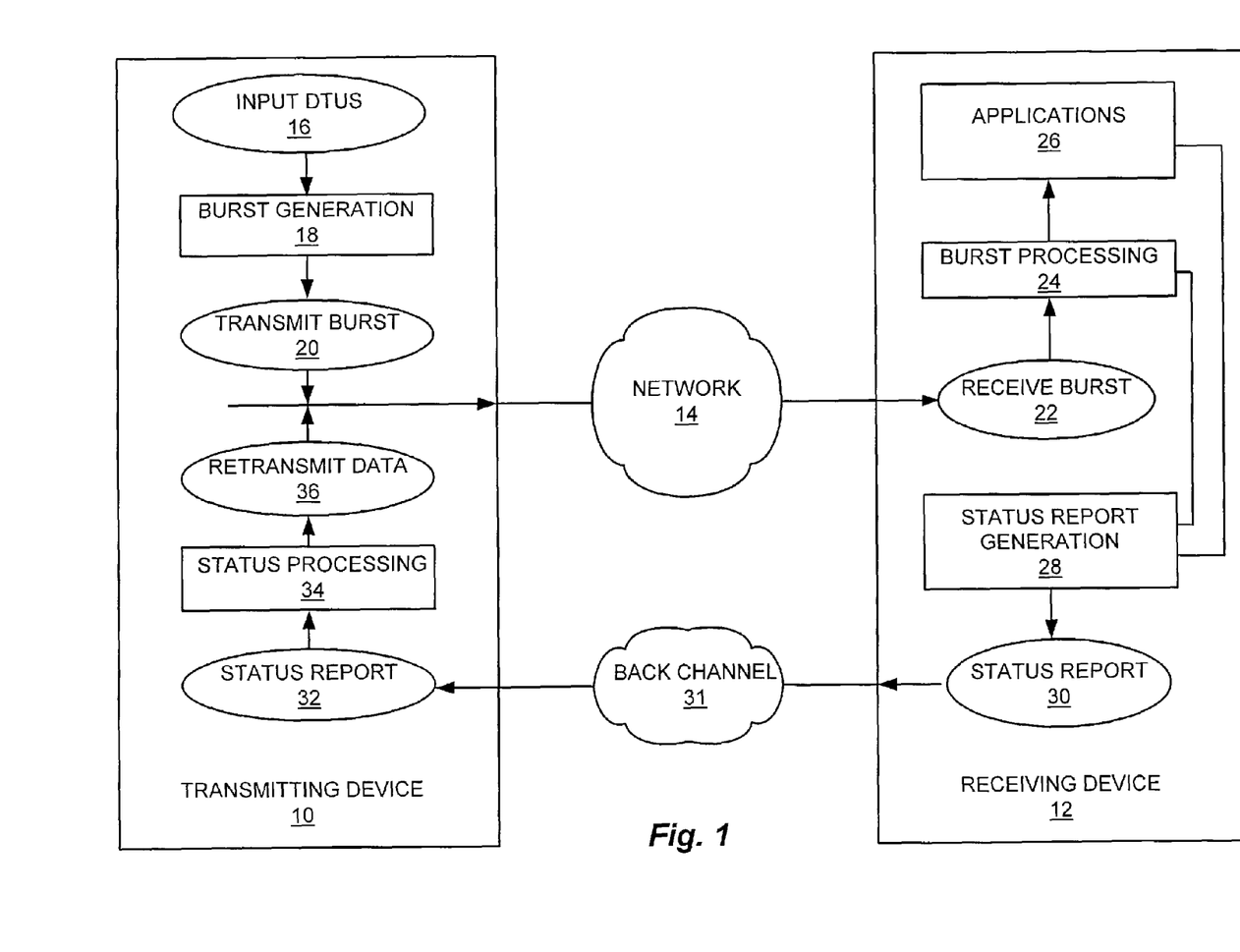
FIG. 1 is a block diagram showing a transmitting device and a receiving device communicating over a communication network.

As shown in FIG. 1, a transmitting device 10 is communicably attached to a network 14, to which is also attached a receiving device 12. The transmitting device 10 and/or receiving device 12, for example, may each be any specific type of network attached device, such as server computer systems, personal computers, workstations, or other devices capable of communicating over a communication network. The transmitting device 10 and/or receiving device 12 may accordingly each include one or more processors, as well as computer program storage and/or memory for storing computer program code that is executable on such processors. The transmitting device 10 and receiving device 12 may each further include various input/output interfaces, including network interfaces to the network 14. The network 14 may be embodied using any appropriate communication media and networking protocols which enable the transfer of information between the transmitting device 10 and the receiving device 12. In one embodiment, the network 14 is a communication satellite based network over which the transmitting device 10 communicates with multiple receiving devices, such as the receiving device 12, using multicast or group destination addresses.

During operation of the devices shown in FIG. 1, a number of data transfer units (DTUs) 16 are input to a burst generation processing component 18 of the transmitting device 10. The disclosed system may be used with any specific kind of DTU, including packets, cells, or other types of data blocks. The burst generation component 18 may, for example, be embodied using any appropriate combination of software code and/or programmable or custom hardware based technology. The burst generation component 18 in the transmitting device 10 operates to organize the DTUs into reliably delivered sets of DTUs, referred to herein as "bursts." Multiple bursts may be processed simultaneously in both the transmitting device and the receiving device(s).

A transmit burst 20 generated by the burst generation component 18 is sent by the transmitting device 10 over the network 14 to the receiving device 12. The receiving device 12 receives a burst from the transmitting device 10, and shown as the receive burst 22. The receive burst 22 is processed by the receive burst processing component 24 in the receiving device 12. The receive burst processing component 24 in the receiving device 12 may also, for example, be embodied using any appropriate combination of software code and/or programmable or custom hardware based technology. The receive burst processing component 24 determines which of the DTUs within the receive burst 22 have been correctly received, and passes on a description of any lost or damaged DTUs to the status report generating component 28. The receive burst processing component 24 also operates to pass the DTUs from the receive burst 22 to one or more application programs 26 for processing. The application programs 26 in turn operate to report the processing status of each DTU to the status report generating component 28.

The status report generating component 28 processes the information regarding correct delivery and processing of received DTUs in order to generate one or more status report messages, such as the status report 30. The receiving device 12 then operates to transmit the status report 30 to the transmitting device 10, where it is shown as the received status report 32. The status report 30 may be conveyed to the transmitting device 10 using any appropriate type of message format, such as a burst, single DTU, or other message. In a first embodiment, the status report 30 is conveyed from the receiving device 12 to the transmitting device 10 over a back channel 31, separate from the network 14 over which data bursts are sent from the transmitting device 10 to the receiving device 12. In the case where the network 14 is a communication satellite based network over which the transmitting device 10 communicates with multiple receiving devices, the back channel 31 may be provided using a relatively low bandwidth, high latency communication service, for example over the Internet. Alternatively, the status report 30 may be sent to the transmitting device 10 using the same network over which the data bursts are conveyed to the receiving device 12, shown as the network 14 in FIG. 1.

When a status report 32 is received by the transmitting device 10, the received status report 32 is passed to the status report processing component 34. The status report processing component 34 examines the received status report 32 to determine which previously transmitted DTUs need to be retransmitted to the receiving device 12. Those previously transmitted DTUs which need to be retransmitted are shown as retransmitted data 36, and are sent, for example over the network 14, to the receiving device 12. Upon the correct receipt of the retransmitted data 36 by the receiving device 12, previously sent DTUs that were damaged or lost are replaced and delivered to relevant application programs as necessary. Subsequent status reports from the receiving device 12 may accordingly reflect the receipt and processing status of such retransmitted data. The receive burst processing component 24, status report generating component, and status report processing component 34 may each be embodied using any appropriate combination of software code and/or programmable or custom hardware based technology.

While for purposes of concise illustration a single receiving device 12 is shown in FIG. 1, the disclosed system is advantageously applicable where a single transmitting device 10 operates to transmit individual bursts that are each received by multiple receiving devices. For example, such may be the case where multicast destination addresses are employed by the transmitting device. In the case where multiple receiving devices receive the bursts transmitted by the transmitting device, the structure and operation described herein with reference to receiving device 12 may be applicable to any or all such multiple receiving devices.

Figure 2:
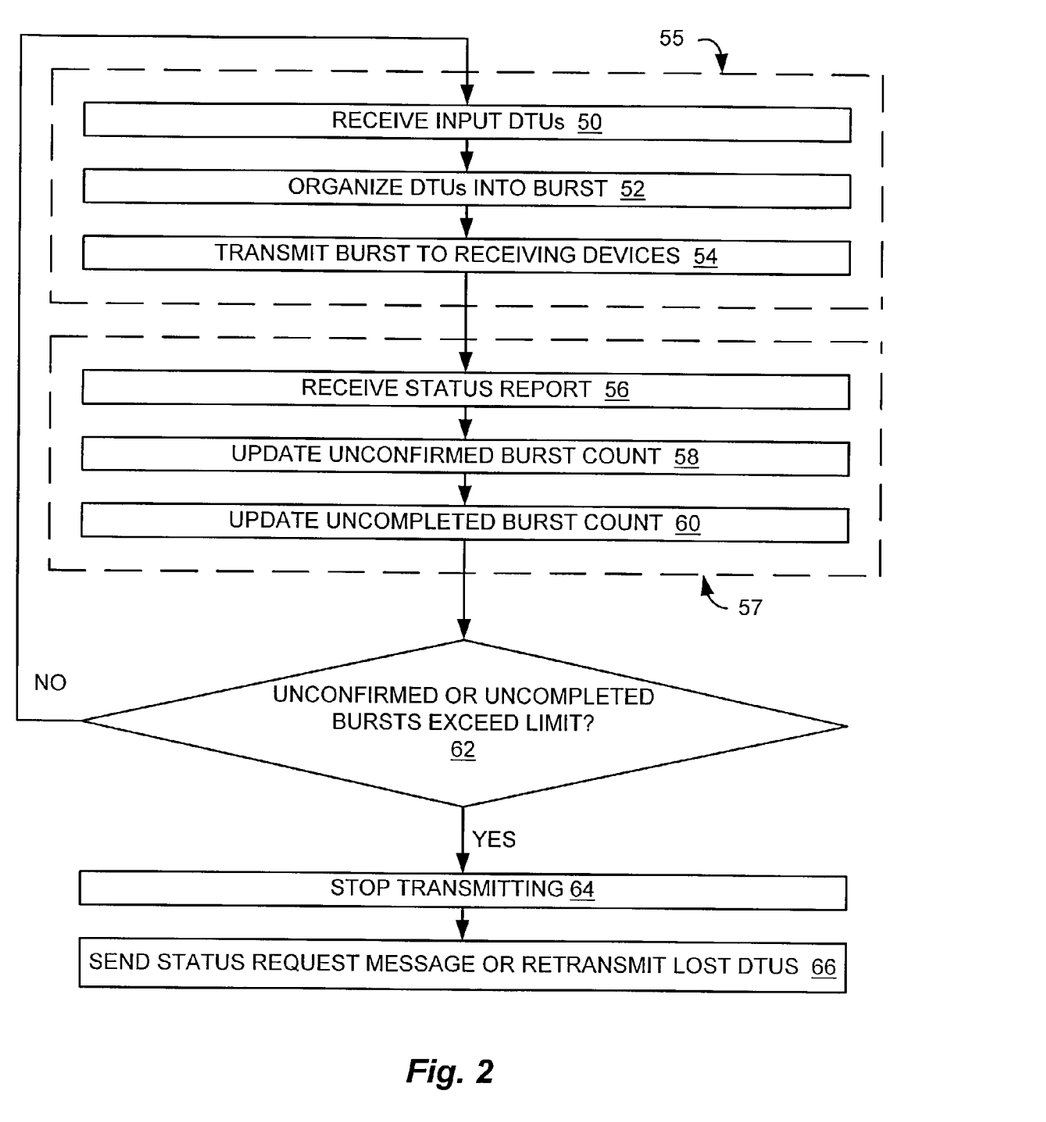
FIG. 2 is a flow chart showing steps performed by an illustrative embodiment of a transmitting device.

Now with reference to FIG. 2, steps performed by an illustrative embodiment of a transmitting device, such as the transmitting device 10 of FIG. 1, are described. At step 50, the transmitting device receives a number of DTUs for transmission to one or more receiving devices, such as the receiving device 12 of FIG. 1. At step 52, the transmitting device organizes a set of the DTUs received at step 52 into at least one burst for transmission. In the illustrative embodiment, each DTU within a burst contains information that enables a receiving device to determine the end of the burst, such as a position of that DTU within the burst.

The size of a burst, in terms of the number of DTUs within the burst, is referred to as the "burst size." The burst size for a given communication session may be a configurable parameter, determined and distributed among the transmitting device and receiving devices using a predetermined management protocol. Burst size is predetermined for purposes of explanation in the illustrative embodiment. A suitable burst size value for a given implementation may be determined in a variety of different ways. For example, an embodiment of the disclosed system has been shown to operate well where the burst size is set to a value on the order of 100 or 1000 DTUs. The burst generated at step 52 is transmitted to one or more receiving devices at step 54.

Steps 50, 52 and 54 represent a burst transmission process 55. Burst transmission 55 continues while status reports are concurrently received and processed in a status report receive process 57, until a stop transmit condition is detected in step 62 as described below. Now with reference to the status report receive process 57, at step 56 the transmitting device receives a status report message. The received status report message includes information describing the status of DTUs in previously transmitted bursts, with regard to one of potentially many receiving devices.

In an illustrative embodiment, the transmitting device maintains state with regard to previously transmitted bursts as follows:
1) A "confirmed burst" is a previously transmitted burst for which the transmitting device has received status reports from all receiving devices to which the burst was addressed. The DTUs within a confirmed burst may or may not have been successfully received by all receiving devices for that burst.

2) An "unconfirmed burst" is a previously transmitted burst for which the transmitting device has not received a status report from at least one of the receiving devices to which the burst was addressed.

3) A "completed burst" is a confirmed burst for which all receiving devices have confirmed that they have successfully received and processed all DTUs within the burst.

4) An "uncompleted burst" is a confirmed or unconfirmed burst that requires some amount of retransmission, since at least one of the receiving devices to which the burst was addressed has indicated that at least one DTU within the burst was lost or damaged.

During processing of a status report received at step 56, the transmitting device updates counters or other data structures that are used to maintain the numbers of bursts that fall within each of the above categories. In particular, at step 58, the transmitting system may update an unconfirmed burst counter, or the equivalent, to reflect the number of unconfirmed bursts in view of the information contained in the status report. For example, in the event that status reports have been received from every receiving device for a given burst, then a number of unconfirmed bursts is effectively decremented at step 58. Similarly, if all the receiving devices for a given burst have provided status reports indicating that all DTUs within that burst have been successfully received processed, then a representation of the number of uncompleted bursts can be decremented at step 60. Those skilled in the art will recognize that a variety of specific mechanisms can be used for maintaining counts with regard to the above listed categories of bursts. The disclosed system is not limited to decrementing individual counters for unconfirmed bursts and uncompleted bursts at steps 58 and 60, and other specific data structures and/or steps may be used to maintain counts for some or all of the above burst categories. Moreover, those skilled in the art will further appreciate that while the above categories are described for purposes of explanation as numbers of bursts, they may be maintained as numbers of DTUs, or bytes, or some other appropriate metric in a given implementation.

Steps 62, 64 and 66 of FIG. 2 illustrate steps taken in an embodiment of the transmitting device in the disclosed system to request status reports from receiving devices. Again, the steps 62, 64 and 66 may be performed concurrently with the burst transmission process 55 and status report receive process 57. At step 62, the disclosed system determines whether either:

a) a total number of unconfirmed bursts exceeds a predetermined maximum number of unconfirmed bursts, or b) a total number of uncompleted bursts exceeds a predetermined maximum number of uncompleted bursts.

In the event that either of the above conditions are met, step 62 is followed by step 64, which causes the transmitting device to stop transmitting bursts. For example, the maximum number of unconfirmed bursts may represent a limit on the amount of receive buffers for receiving bursts in any of the receiving devices in a group of receiving devices to which bursts are transmitted by the transmitting device. The maximum number of uncompleted bursts may represent a limit on the amount of buffers available to for storing previously transmitted bursts in the transmitting device. If neither of the conditions checked in step 62 are true, then burst transmission continues, as shown in FIG. 2 by step 62 being followed by step 50.

Further in response to a determination that one of the conditions checked in step 62 is true, at step 66 the disclosed system operates to send one or more status request messages, and/or retransmit any lost or damaged DTUs to one or more receiving devices. For example, in the case where the number of unconfirmed bursts exceeds the predetermined limit, then at step 66 the transmitting device may operate to send status request messages to one or more of the receiving devices, requesting status reports be returned. For example, in one embodiment, the status request message includes a list of device identifiers corresponding to those receiving devices for which status reports are requested.

In the case where the number of uncompleted bursts exceeds the predetermined limit, then at step 66 the transmitting system may transmit some number of DTUs reported to be lost or damaged to one or more receiving devices. Alternatively, or in addition, other conditions may trigger transmitting devices in the disclosed system to retransmit data and/or sent status request messages. For example, the transmitting device may initiate a process in which lost data is retransmitted in response to a determination that the total number of lost DTUs is equal to the size of a burst, and/or when the data for a next burst is not yet available for transmission. A transmitting device may further be designed or configured to initiate retransmission of lost data as soon as a given burst has been confirmed, in that status reports have been received from all receiving devices. Alternatively, a transmitting device may operate such that it does not wait until a burst has been fully confirmed to start transmitting DTUs that have been reported as lost, acting to retransmit DTUs to those receiving devices that have provided status reports indicating that the DTUs have been lost.

After a predetermined number of requested status reports have been received, or after a predetermined number of DTUs reported as lost have been retransmitted and successfully received and processed, the transmitting device resumes burst transmission at step 50. For example, when the number of unconfirmed bursts has gone below the predetermined limit on unconfirmed bursts, or when some threshold lower than the predetermined limit on unconfirmed bursts has been reached, step 66 may be followed by step 50. Similarly, when the number of uncompleted bursts has gone below the predetermined limit on uncompleted bursts, or when some threshold lower than the predetermined limit on uncompleted bursts has been reached, step 66 may be followed by step 50. Those skilled in the art will further recognize that the status report receive process 57 may, in some embodiments, operate concurrently with steps 62, 64 and 66.

Figure 3:
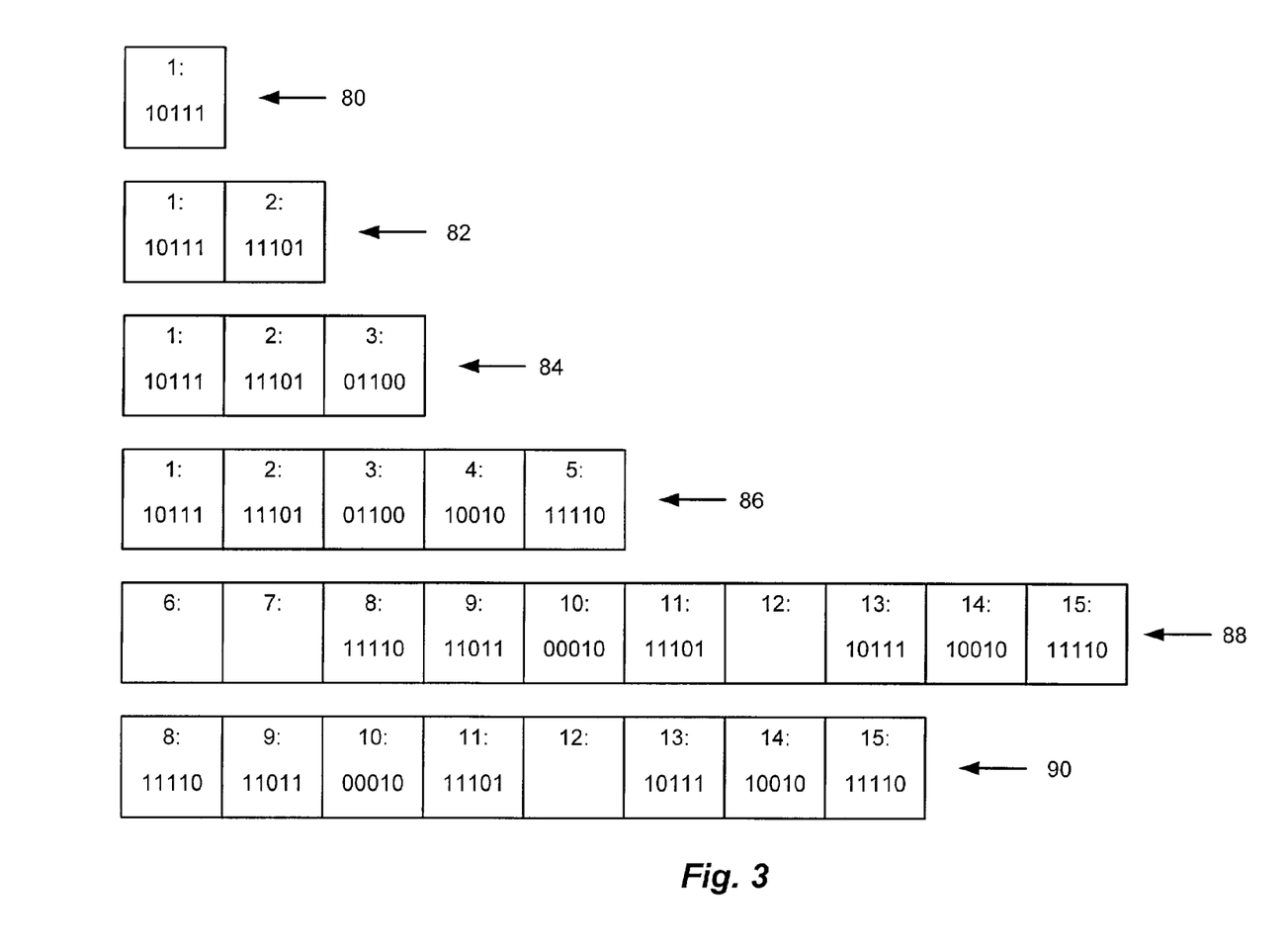
FIG. 3 is a block diagram showing status reports provided in an illustrative embodiment.

FIG. 3 shows a logical representation of a series of status reports generated and processed in an embodiment of the disclosed system. In one embodiment of the disclosed system, a status report is generated and sent by a receiving device to a transmitting device each time the receiving device detects the end of a received burst. For example, the receiving device may determine the end of a burst as a result of the transmitting device providing an indication within each DTU of that DTU's position within the burst, and having been initially provided with the burst size in terms of a total number of DTUs to be expected in each burst.

Due to various events or conditions, any given status report may be lost in transit between the receiving device and the transmitting device. Advantageously, and as illustrated in FIG. 3, each status report message includes information regarding all uncompleted bursts with regard to the receiving device issuing the status report.

The series of status reports shown in FIG. 3 correspond to a series of bursts sent from a transmitting device to a receiving device. Burst entries within the status report contain information indicating whether the DTUs of an associated burst were correctly received by the receiving device. The presence or absence of a burst entry for a given burst indicates whether the DTUs within the corresponding burst have been processed by associated application programs within the receiving device. In the event that all the DTUs within a burst have been correctly received and processed by one or more associated application programs, then the entry for that burst is completely omitted from the status report. A bit mask of binary values is used in the illustrative embodiment to indicate whether DTUs within bursts were correctly received by the receiving device. A binary 1 indicates that the corresponding DTU within the burst was correctly received, whereas a binary 0 indicates that the corresponding DTU within the burst was not correctly received, and that therefore retransmission is required. When all the DTUs within a given burst have been correctly received and stored by the receiving device, a relatively small placeholder, such as the number of the associated burst, is used as the entire entry for that burst in the status report. Such a burst number may reflect the number of the associated burst with respect to the beginning of a communications session between the transmitting device and the receiving device. The use of placeholder entries, and the omission of entries for bursts that have been completely processed, reduces the overall size of the status reports, thus conserving bandwidth and improving overall efficiency.

In FIG. 3, the status report 80 indicates that for a first burst, having for example five DTUs, the first, third, fourth and fifth DTU were received correctly by the receiving device, as indicated by 1s in the first, third, fourth and fifth positions of the bit mask in the first entry of the status report. The status report 80 further indicates that the second DTU in the first burst was not received correctly, as indicated by the 0 bit in the second position of the bit mask of that entry, and that therefore a retransmission of the second DTU in the burst is required. While the burst size is five DTUs in the example of FIG. 3, those skilled in the art will recognize that the present invention is not so limited, and that various specific burst sizes may be used as appropriate for specific embodiments and/or implementations.

The status report 82 of FIG. 3 repeats the entry for the first burst, and also includes an entry showing the status bit mask for a second burst. The entry for the second burst in the status report 82 indicates that forth DTU in the second burst was not correctly received, and must be retransmitted. Similarly, the status report 84 in FIG. 3 includes an entry for a third burst, indicating that the first, fourth and fifth DTUs in that burst must be retransmitted. In the example of FIG. 3, a status report is generated and transmitted following receipt of each burst by the receiving device. Accordingly, the status report 80 would be transmitted following receipt of a first burst, the status report 82 would be transmitted following receipt of a second burst, and so on. However, for purposes of explanation, the status report that would be transmitted following receipt of the fourth burst is not shown in FIG. 3, illustrating how the disclosed system provides status information even in the event that a status report is lost. Accordingly, in the event that the status report for the fourth burst is lost in transit from the receiving device to the transmitting device, the transmitting device would receive the status report 86 following the status report 84. The status report 86 would be generated and transmitted by the receiving device following receipt of the fifth burst. Significantly, the status report 86 includes information describing the delivery and processing status of all bursts up to and including the fifth burst. Therefore, the status report includes an entry corresponding to the fourth burst, as well as the fifth burst, thus bringing the transmitting device up to date with regard to the delivery and processing status of all previously received bursts.

The status report 88 is generated by the receiving device following the receipt of the $15^{th}$ burst. The status report 88 omits entries for bursts 1–5, thus indicating that all DTUs within bursts 1–5 have been correctly received by the receiving device, and also processed by one or more application programs within the receiving device. Further in the status report 88, the entries for the $6^{th}$, $7^{th}$ and $12^{th}$ bursts are placeholders, indicating the number of the bursts they correspond to within the series of bursts associated with the status report. The inclusion of placeholders for the $6^{th}$, $7^{th}$ and $12^{th}$ burst entries indicates to the transmitting device that the DTUs within the $6^{th}$, $7^{th}$ and $12^{th}$ bursts were received correctly by the receiving device, but have not yet been processed by an associated application program in the receiving device.

The status report 90 also reflects the status of bursts 1–15, but omits the entries for bursts 6 and 7 as well, thus indicating that the DTUs in bursts 6 and 7 have also been correctly received and processed by one or more application programs in the receiving device. The status report 90 may therefore illustrate a status report sent subsequent to the status report 88, for example in response to a status request from the transmitting device.

As illustrated in FIG. 3 and described above, a receiving device in the disclosed system operates to include implicitly or explicitly information about the receipt status of all bursts that have previously been received by that receiver, for example over the course of a communications session between the receiver and the transmitter. The receiving device also provides each status report with status information regarding all previously transmitted bursts. Thus the receipt status for all DTUs in every previously received burst is transmitted multiple times from the receiving device to the transmitting device. This redundancy of information provided from the receiving device to the transmitting device is provided using a total number of status report packets equal to the number of bursts. Accordingly, the present system improves the reliability of status report delivery without increasing the number of status report packets beyond the number that would be used to report on the status of each burst individually. Significantly, the present invention reduces reliability requirements for a back-channel that may be used to provide status reports from multiple receiving devices to a transmitting device. Accordingly, for example, in an operational environment in which a multicast enabled, communication satellite based network is used to convey information from a transmitting device to multiple receiving devices, a relatively low reliability back-channel, such as the Internet may be used to convey status report packets from the receiving devices to the transmitting device without concern that some status report packets may be lost. For these reasons, the presently disclosed system is especially significant in communication satellite-based networks, which often use back-channels having relatively low reliability.

Other information may also be included in status report messages from a receiving device to a transmitting device. For example, a status report may indicate the amount of data, for example in terms of bytes or DTUs, that the receiving device can accept from the transmitting device before running into a resource limitation, such as a lack of receive buffers.

Figure 4:
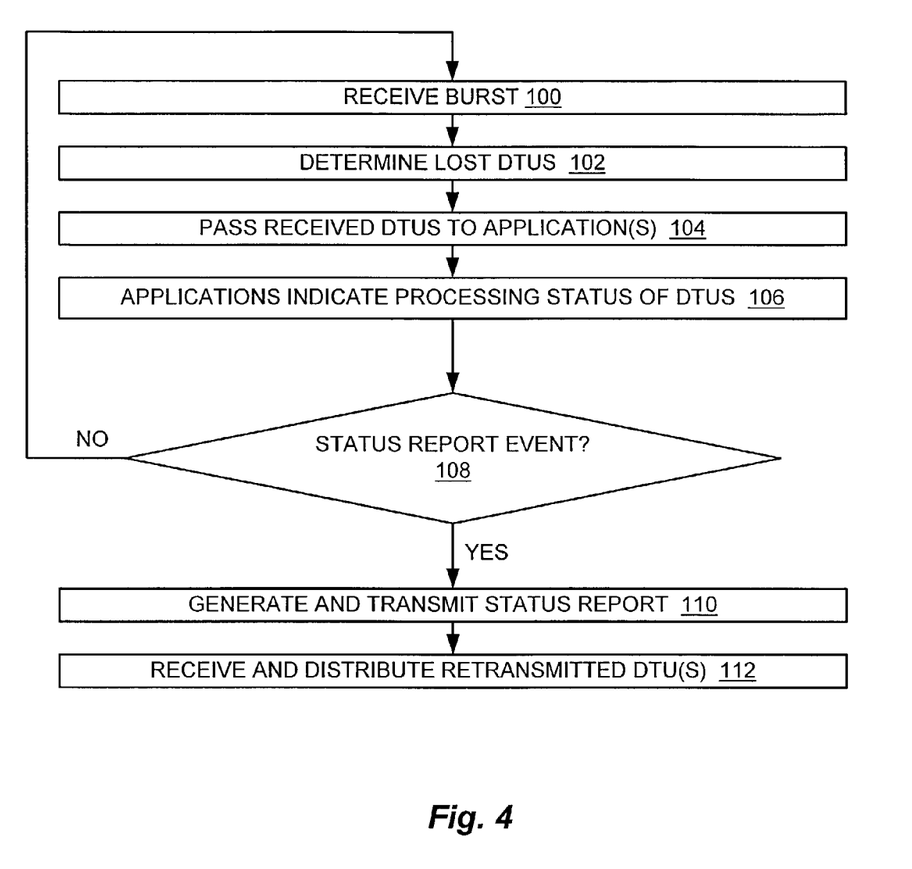
FIG. 4 is a flow chart showing steps performed by an illustrative embodiment in a receiving device.

FIG. 4 is a flow chart illustrating steps performed in a receiving device of an illustrative embodiment of the disclosed system. At step 100 the receiving device receives a burst, and then determines at step 102 which, if any, DTUs in the burst were lost or damaged. Determination of lost or damaged DTUs may, for example, be performed using information within the burst, such as burst numbers, and/or conventional data integrity checks on each DTU, such as cyclic redundancy code (CRC) checks. The receiving device maintains the location of each lost or damaged DTU in the burst for subsequent transmission in a status report. At step 104, the receiving device passes successfully received DTUs from the received burst to one or more associated application programs. The application programs in turn record or provide indication of the processing status of each DTU they are passed for use when forming status reports.

At step 108, the receiving device determines whether an event has occurred indicating that a status report should be transmitted to the transmitting device. In one embodiment, for example, a status report is generated and transmitted to the transmitting device in the event the end of a received burst is detected by the receiving device. Alternatively, or in addition, status reports may be generated and/or transmitted in the event that a status request message is received from the transmitting device. While no events triggering generation of a status report are detected, step 108 is followed by step 100, indicating the continued receipt of bursts by the receiving device.

In the event a status report is triggered by an event detected at step 108, at step 110 at least one status report is generated and transmitted to the transmitting device. The status report includes information indicating both the DTUs that require transmission within all previously received bursts, as well as the processing status of all DTUs in previously received bursts. The format of the status report generated at step 110 is, for example, the format described above in connection with FIG. 3. In response to indication of lost DTUs in the status report generated and transmitted at step 110, the receiving device will receive retransmitted data at step 112, which can then be used to substitute for the previously lost or damaged DTUs. Those skilled in the art will recognize that the order of the steps shown in FIG. 4 is just one possible ordering, and that a given implementation or series of events may result in a different specific ordering. In particular, parallelism may be provided such that component functionality implementing two or more of the steps in FIG. 4 may allow those steps to be performed concurrently for purposes of efficiency and/or performance.

Figure 5:
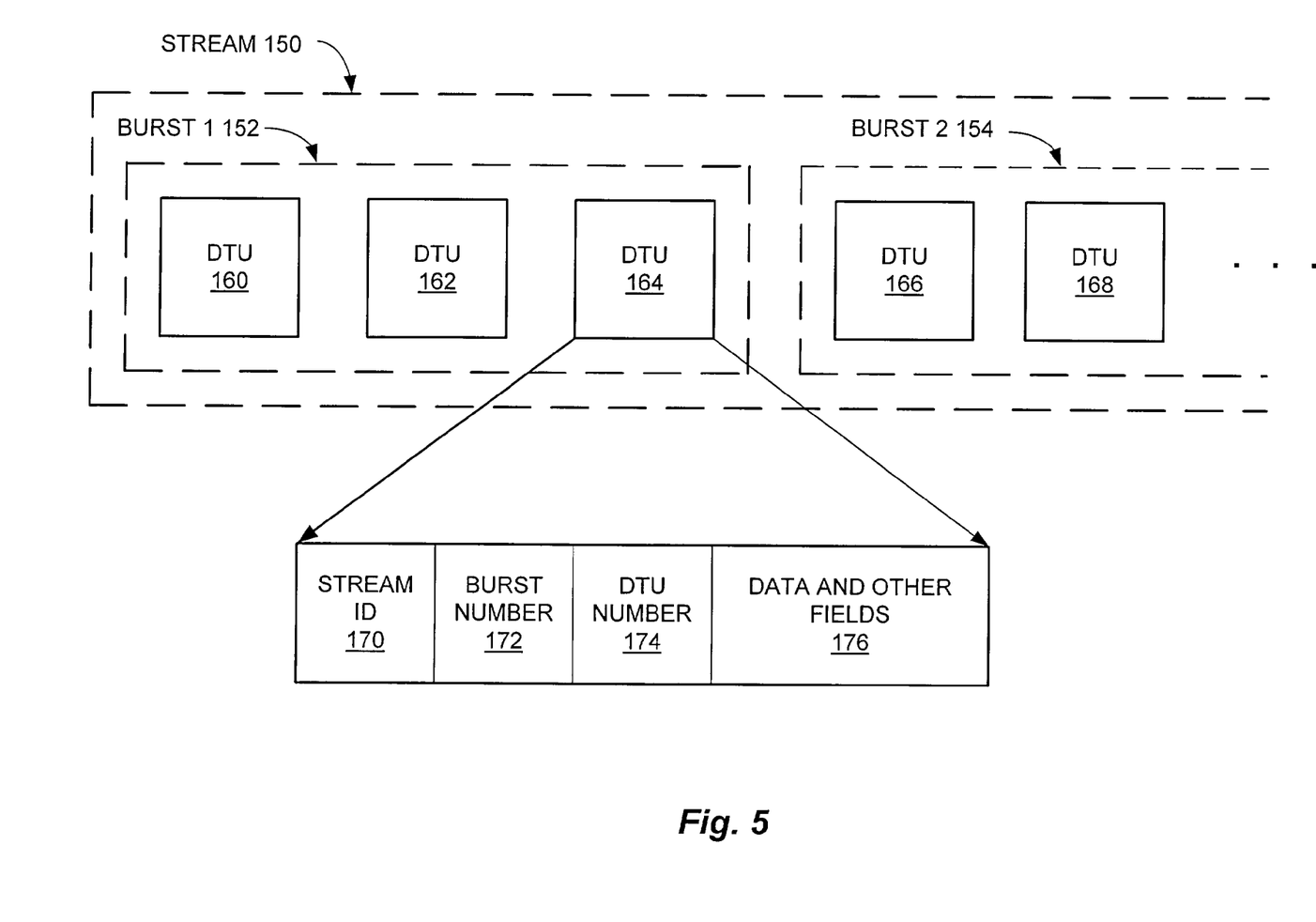
FIG. 5 is a block diagram showing an example of bursts of DTUs in a communication stream.

FIG. 5 shows an example of a data stream 150 including a series of multiple bursts, shown as burst 1 152 and burst 2 154. The stream 150 represents the communication of a contiguous stream of data from a transmitting device to multiple receiving devices, for example using multicast addressing, as in the case of a streaming media server application. A data stream such as the data stream 150 may include any number of bursts. Each of the bursts within the data stream 150 includes a series of multiple DTUs, shown as DTU 160, DTU 162 and DTU 164 in burst 1 152, and as DTU 166 and DTU 168 in burst 2 154. An example of fields for a DTU is shown with regard to DTU 164. The illustrative DTU fields are shown as including a stream ID 170, which identifies the data stream that includes the DTU, a burst number 172 that identifies the position of the burst containing the DTU within the stream, and a DTU number 174 that identifies the position of the DTU within the burst that contains it. The DTU 164 is further shown to include data and other fields 176.

As shown in FIG. 5, a burst may not include header information other than that associated with each DTU. Specifically, the association of DTUs into a burst is accomplished through the information contained in the burst number field 172 of each DTU contained in the burst. Further, the structure of each burst, in terms of the positions of the DTUs it contains, is described in the DTU number field 174. Accordingly, the burst "header" may be thought of as being distributed across the DTUs included within the burst.

Figure 6:
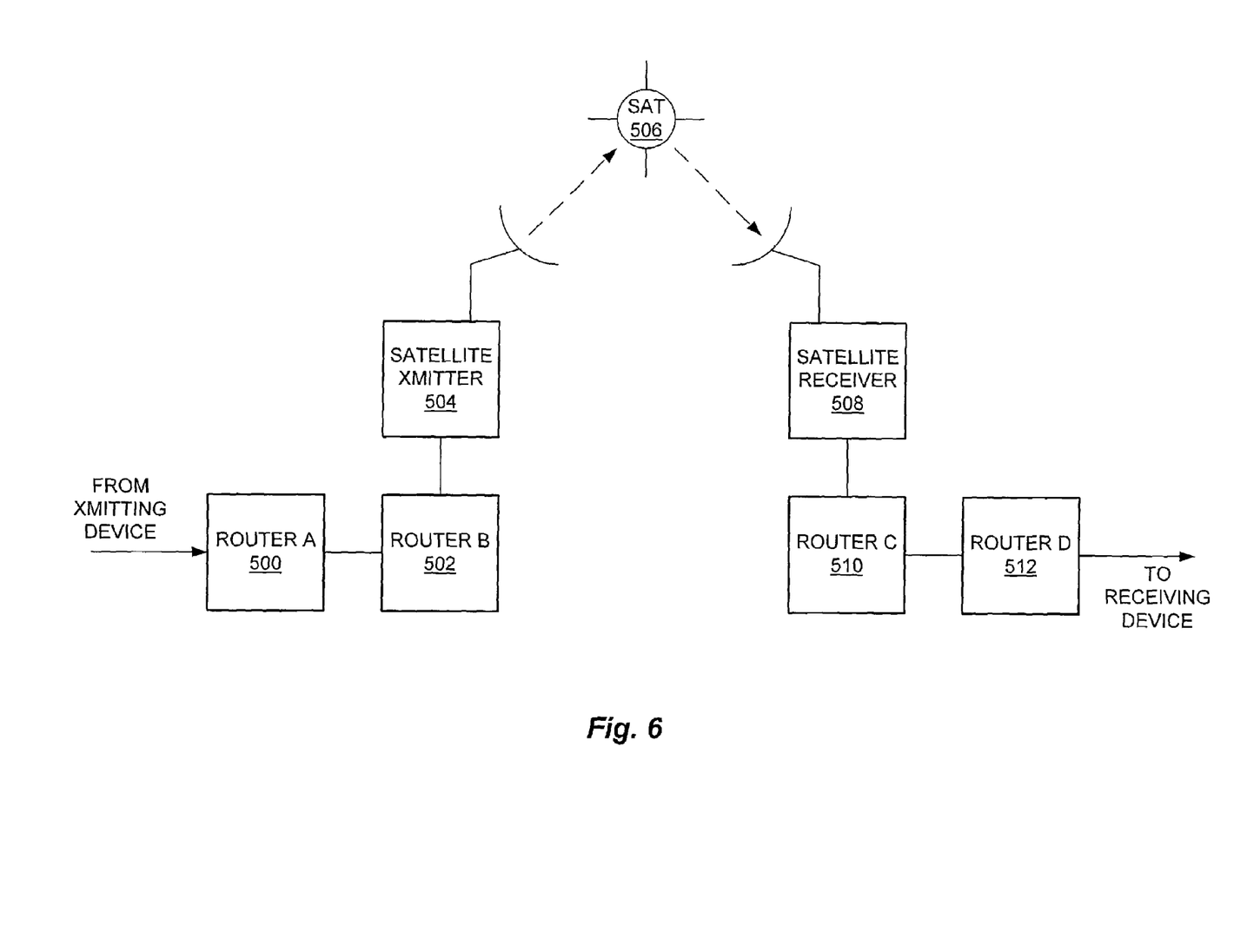
FIG. 6 shows an example configuration of the network 14 in FIG. 1.

FIG. 6 is a block diagram showing an example of a network over which data may be communicated using an embodiment of the disclosed system. The network illustrated in FIG. 6 is an example of the network 14 shown in FIG. 1. As shown in FIG. 6, data from a transmitting device passes through a Router A 500, to a Router B 502, and then to a Satellite Transmitter 504, which forwards the data to a Communications Satellite 506. The data is then passed by the Communications Satellite 506 to a Satellite Receiver 508, from which the data is passed through Router C 510 and Router D 512 to one or more receiving devices. The routers shown in FIG. 6 operate over an underlying communications network for which an MTU (Maximum Transmission Unit, Maximum Transfer Unit) may be predefined. The MTU for such a communications network is the largest frame size that can be transmitted over the network. Messages longer than the MTU must be divided into smaller frames. Typically, the layer 3 protocol (IP, IPX, etc.) extracts the MTU from the layer 2 protocol (Ethernet, FDDI, etc.), fragments the messages into that frame size and makes them available to the lower layer for transmission.

Figure 7:
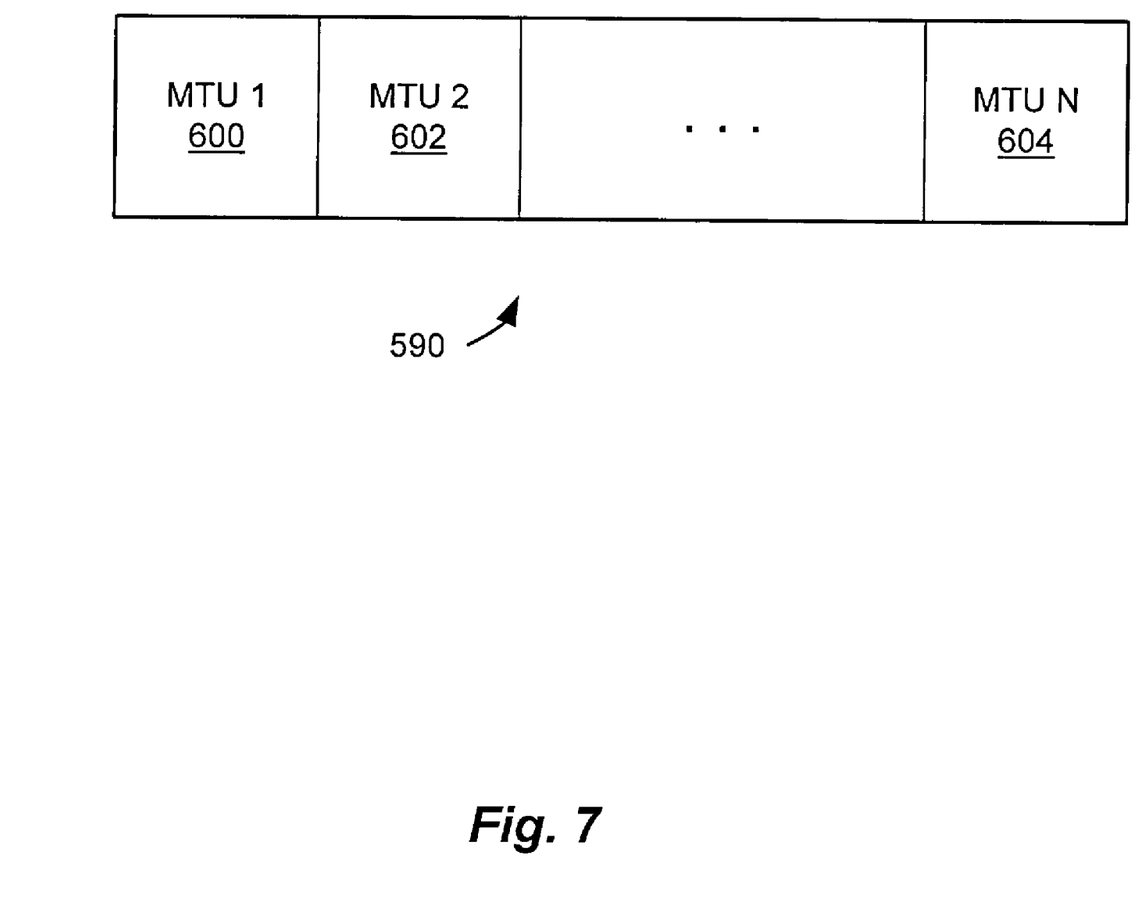
FIG. 7 shows an example of the data and other fields portion 176 of a DTU as shown in FIG. 5.

FIG. 7 shows how the contents of an individual DTU may be configured to reflect the MTUs used in an underlying network such as the communications network shown in FIG. 6. As shown in FIG. 5, the format of a DTU may include a data and other fields portion 176. FIG. 7 shows an example of the format of the data and other fields portion of the DTU. The format shown in FIG. 7 includes one or more MTUs, including an MTU 1 600, MTU 2, 602, through MTU N 604. In this way, the size of the DTU may be advantageously determined to reflect the size of MTU within the underlying network. As a result, bandwidth utilization is improved. In specific embodiments or operational environments, the contents of each DTU may therefore consist of one or more Ethernet packets, or one or more IP packets.

The DTU size for a given embodiment may further be configured as a function of the loss rate of the underlying network. In this approach, smaller DTU sizes would be used when the underlying network provides more unreliable performance. Accordingly, for higher loss rates, smaller DTUs would be used, thus making relatively frequent retransmission of data more efficient, since less successfully received data would necessarily be included in each retransmission.

In a preferred embodiment, the disclosed system operates in an environment in which file and/or streaming media content delivery is provided from a transmitting device to multiple receiving devices. Those skilled in the art will readily appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD- ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

We claim:

1. A method for providing status information from a receiving device to a transmitting device, comprising:
   receiving a plurality of data bursts from said transmitting device, wherein said data bursts each include a plurality of data transfer units;
   determining a delivery status of each of said data transfer units in said plurality of data bursts;
   generating a status report, wherein said status report includes a delivery status with regard to each of said data transfer units in said plurality of data bursts, wherein said delivery status indicates whether a corresponding one of said data transfer units in said plurality of data bursts must be retransmitted, and
   transmitting said status report to said transmitting device.

2. The method of claim 1, wherein said plurality of data bursts comprise all data bursts received by said receiving device from said transmitting device prior to said generating of said status report.

3. The method of claim 1, wherein said plurality of data bursts comprise all data bursts received by said receiving device from said transmitting device since the beginning of a communication session between said transmitting device and said receiving device.

4. The method of claim 1, further comprising:
   passing at least one of said data transfer units in said plurality of data bursts to at least one application program;
   determining, responsive to said at least one application program, a processing status of said at least one of said data transfer units in said plurality of data bursts; and
   wherein said generating said status report further includes representing in said status report said processing status of said at least one of said data transfer units in said plurality of data bursts.

5. The method of claim 4, wherein said processing status indicates whether said at least one of said data transfer units has been completely processed by said at least one application program.

6. The method of claim 4, further comprising:
   generating an entry for each one of said plurality of data bursts, wherein said entry includes a bit mask including a plurality of bits, wherein each of said bits indicates whether a corresponding data transfer unit in an associated one of said plurality of data bursts should be retransmitted by said transmitting device, wherein said generating said entry for each one of said plurality of data bursts includes storing a burst number in each of said entries, wherein said burst number indicates a position of an associated burst in time with respect to each other burst received by said receiving device from said transmitting device; and
   in the event that all data transfer units in one of said plurality of data bursts have been processed by at least one application program in said receiving device, omitting an entry corresponding to said one of said plurality of data bursts in said status report.

7. The method of claim 1, wherein said generating said status report further comprises:
   generating an entry corresponding to at least one of said plurality of data bursts, wherein said entry includes a bit mask including a plurality of bits, wherein each of said bits indicates whether a corresponding data transfer unit in said corresponding data burst should be retransmitted by said transmitting device.

8. The method of claim 7, wherein said generating said entry corresponding to said at least one of said plurality of data bursts further comprises generating a plurality of entries, each one of said plurality of entries corresponding to one of said plurality of data bursts.

9. The method of claim 7, wherein said generating said status report further comprises omitting said bit mask from said entry in the event that all data transfer units in said associated one of said plurality of data bursts were delivered to said receiving device correctly.

10. The method of claim 9, wherein said generating said status report further comprises including a burst number in each of said entries, wherein said burst number indicates a position of an associated data burst in time with respect to each other data burst received by said receiving device from said transmitting device.

11. A device for providing status information regarding data transmitted from a transmitting device to said device, said device operable to:
    receive a plurality of data bursts from said transmitting device, wherein said data bursts each include a plurality of data transfer units;
    determine a delivery status of each of said data transfer units in said plurality of data bursts;
    generate a status report, wherein said status report includes a delivery status with regard to each of said data transfer units in said plurality of data bursts, wherein said delivery status indicates whether a corresponding one of said data transfer units in said plurality of data bursts must be retransmitted; and
    transmit said status report to said transmitting device.

12. The device of claim 11, wherein said device further comprises at least one processor coupled to a program memory.

13. A computer program product, including a computer readable medium, said computer readable medium having a computer program stored thereon, said computer program for providing status information regarding data transmitted from a transmitting device to a receiving device, said computer program comprising:
    program code for receiving a plurality of data bursts from said transmitting device, wherein said data bursts each include a plurality of data transfer units;
    program code for determining a delivery status of each of said data transfer units in said plurality of data bursts;
    program code for generating a status report, wherein said status report includes a delivery status with regard to each of said data transfer units in said plurality of data bursts, wherein said delivery status indicates whether a corresponding one of said data transfer units in said plurality of data bursts must be retransmitted; and
    program code for transmitting said status report to said transmitting device.

14. A system for providing status information regarding data transmitted from a transmitting device to a receiving device, comprising:
- means for receiving a plurality of data bursts from said transmitting device, wherein said data bursts each include a plurality of data transfer units;
- means for determining a delivery status of each of said data transfer units in said plurality of data bursts;
- means for generating a status report, wherein said status report includes a delivery status with regard to each of said data transfer units in said plurality of data bursts, wherein said delivery status indicates whether a corresponding one of said data transfer units in said plurality of data bursts must be retransmitted; and
- means for transmitting said status report to said transmitting device.

15. A method for determining the status of data transmitted from a transmitting device to at least one receiving device, comprising:
- transmitting a plurality of data bursts from said transmitting device to said receiving device, wherein said data bursts each include a plurality of data transfer units;
- receiving at least one status report from said receiving device, wherein said status report indicates a delivery status with regard to each of said data transfer units in said plurality of data bursts; and
- retransmitting at least one data transfer unit from said plurality of bursts to said receiving device in response to said status report.

16. The method of claim 15, wherein said plurality of data bursts comprise all data bursts previously transmitted by said transmitting device to said receiving device.

17. The method of claim 15, wherein said status report further indicates a processing status of at least one of said data transfer units in said plurality of bursts with respect to at least one application program in said receiving device.

18. The method of claim 15, wherein said status report comprises a plurality of entries corresponding to respective ones of said plurality of data bursts.

19. The method of claim 15, wherein said status report further comprises an entry corresponding to at least one of said plurality of data bursts, wherein said entry includes a bit mask including a plurality of bits, wherein each of said bits indicates whether a corresponding data transfer unit in an associated one of said plurality of data bursts should be retransmitted by said transmitting device.

20. The method of claim 19, wherein said status report further comprises at least one place holder entry corresponding to at least one of said data bursts for which no data transfer unit requires retransmission.

21. The method of claim 20, wherein said place holder comprises a burst number indicating a position of said corresponding data burst in time with respect to each other data burst transmitted by said transmitting device.

22. The method of claim 20, wherein said status report omits at least one entry corresponding to one of said data bursts including data transfer units that have all been processed by at least one application program in said receiving device.

23. A device for processing status information regarding data transmitted from said device to a receiving device, said device operable to:
- transmit a plurality of data bursts to said receiving device, wherein said data bursts each include a plurality of data transfer units;
- receive at least one status report from said receiving device, wherein said status report indicates a delivery status with regard to each of said data transfer units in said plurality of data bursts; and
- retransmit at least one data transfer unit from said plurality of bursts to said receiving device in response to said status report.

24. The device of claim 23, wherein said device further comprises at least one processor coupled to a program memory.

25. A computer program product, including a computer readable medium, said computer readable medium having a computer program stored thereon, said computer program for processing status information regarding data transmitted from a transmitting device to a receiving device, said computer program comprising:
- program code for transmitting a plurality of data bursts to said receiving device, wherein said data bursts each include a plurality of data transfer units;
- program code for receiving at least one status report from said receiving device, wherein said status report indicates a delivery status with regard to each of said data transfer units in said plurality of data bursts; and
- program code for retransmitting at least one data transfer unit from said plurality of bursts to said receiving device in response to said status report.

26. A system for processing status information regarding data transmitted from a transmitting device to a receiving device, comprising:
- means for transmitting a plurality of data bursts from said transmitting device to said receiving device, wherein said data bursts each include a plurality of data transfer units;
- means for receiving at least one status report from said receiving device, wherein said status report indicates a delivery status with regard to each of said data transfer units in said plurality of data bursts; and
- means for retransmitting at least one data transfer unit from said plurality of bursts to said receiving device in response to said status report.

* * * * *